(12) United States Patent
Murayama (10) Patent No.: US 9,098,064 B2
(45) Date of Patent: *Aug. 4, 2015

(54) IMAGE FORMING APPARATUS WITH A MOVABLE TAG READER FOR SENSING TAGS AT VARIOUS LOCATIONS

(71) Applicant: Brother Kogyo Kabushiki Kaisha, Nagoya-shi, Aichi-ken (JP)

(72) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,359

(22) Filed: Nov. 11, 2013

(65) Prior Publication Data

US 2014/0064746 A1    Mar. 6, 2014

Related U.S. Application Data

(63) Continuation of application No. 12/892,169, filed on Sep. 28, 2010, now Pat. No. 8,582,157.

(30) Foreign Application Priority Data

Sep. 29, 2009   (JP) ................................. 2009-224663

(51) Int. Cl.
    G03G 21/18      (2006.01)
    G03G 15/08      (2006.01)
(52) U.S. Cl.
    CPC ........ G03G 21/1878 (2013.01); G03G 15/0822 (2013.01); G03G 15/0863 (2013.01); G03G 21/1882 (2013.01); G03G 2215/0695 (2013.01)

(58) Field of Classification Search
    None
    See application file for complete search history.

(56) References Cited

U.S. PATENT DOCUMENTS

| | | | |
|---|---|---|---|
| 6,654,567 B2 | 11/2003 | Karakama | |
| 7,140,713 B2 | 11/2006 | Kawakami | |
| 7,433,610 B2 | 10/2008 | Oyama | |
| 7,941,061 B2 | 5/2011 | Kadowaki | |
| 2002/0031359 A1 | 3/2002 | Karakama | |
| 2004/0239706 A1 | 12/2004 | Kawakami | |
| 2006/0219770 A1 | 10/2006 | Oyama | |
| 2006/0227693 A1 | 10/2006 | Park et al. | |
| 2007/0080786 A1* | 4/2007 | Kusumi | 340/10.1 |
| 2007/0297814 A1* | 12/2007 | Kasai | 399/12 |
| 2008/0044195 A1* | 2/2008 | Higashiyama et al. | 399/53 |

(Continued)

FOREIGN PATENT DOCUMENTS

JP   2002072824   3/2002
JP   2002127391   5/2002

(Continued)

OTHER PUBLICATIONS

JP2007148006.*

(Continued)

*Primary Examiner* — Fan Zhang
(74) *Attorney, Agent, or Firm* — Banner & Witcoff, Ltd.

(57) ABSTRACT

An image forming apparatus including a wireless tag reader is described. The wireless tag reader is configured to be located in a first position to read wireless tags associated with consumables when the consumables are inserted into, stationary in, or removed from the image forming apparatus, and in a second position to read wireless tags outside of the image forming apparatus.

8 Claims, 8 Drawing Sheets

(56) References Cited

U.S. PATENT DOCUMENTS

| | | |
|---|---|---|
| 2008/0192451 A1 | 8/2008 | Sinnett et al. |
| 2008/0283596 A1 | 11/2008 | Ishida |
| 2008/0317479 A1* | 12/2008 | Kadowaki ............... 399/12 |
| 2009/0216536 A1 | 8/2009 | Matsuhara et al. |

FOREIGN PATENT DOCUMENTS

| | | |
|---|---|---|
| JP | 2002331686 | 11/2002 |
| JP | 2003159808 | 6/2003 |
| JP | 2004142379 | 5/2004 |
| JP | 2004326125 | 11/2004 |
| JP | 2005004230 | 1/2005 |
| JP | 2005257816 | 9/2005 |
| JP | 2006018396 | 1/2006 |
| JP | 2006084984 | 3/2006 |
| JP | 2006098895 | 4/2006 |
| JP | 2006201381 | 8/2006 |
| JP | 2006285124 | 10/2006 |
| JP | 2007047505 | 2/2007 |
| JP | 2007098840 | 4/2007 |
| JP | 2007240575 | 9/2007 |
| JP | 2007264041 | 10/2007 |
| JP | 2007272130 | 10/2007 |
| JP | 2009003099 | 1/2009 |
| JP | 2009014991 | 1/2009 |
| JP | 2009015106 | 1/2009 |
| JP | 2009163274 | 7/2009 |
| WO | 2006090554 | 8/2006 |

OTHER PUBLICATIONS

JP2006018396.*
Decision to Grant a Patent for Japanese patent application No. 2009-224663 mailed Aug. 16, 2011.
Decision to Grant a Patent for Japanese Patent Application No. 2009-224548 mailed Mar. 13, 2012.
JP 2007-047505 translation, Okabe, Feb. 2007.
Notice of Reasons for Rejection dated Aug. 16, 2011 in Japanese Application No. 2009-224548.

* cited by examiner

IMAGE FORMING APPARATUS WITH A MOVABLE TAG READER FOR SENSING TAGS AT VARIOUS LOCATIONS

CROSS REFERENCE TO RELATED APPLICATION

This application claims priority from U.S. Ser. No. 12/892,169, filed Sep. 28, 2010, which claims priority from Japanese Patent Application No. 2009-224663, filed on Sep. 29, 2009, the entire subject matter of which are incorporated herein by reference.

FIELD

Aspects of the disclosure relate to an image forming apparatus including a reader that is configured to read information from a wireless tag attached to a consumable unit.

BACKGROUND

A known image forming apparatus may be configured to read information stored in a wireless tag attached to a toner container. The image forming apparatus includes a main body including a cover, a toner container, a wireless tag attached to the toner container, and a reader configured to read information of the wireless tag. The image forming apparatus may prevent the reader from reading the information of the wireless tag when the cover is opened, and allow the reader to read the information of the wireless tag when the cover is closed.

The image forming apparatus only controls reading of the information of the wireless tag attached to the toner container accommodated inside the image forming apparatus. The reader cannot read a wireless tag which is located outside of the image forming apparatus.

SUMMARY

Aspects of the disclosure may provide an image forming apparatus including a reader that is configured to read information from wireless tags which are not only attached to a consumable unit but also located outside of the image forming apparatus.

BRIEF DESCRIPTION OF THE DRAWINGS

Illustrative aspects will be described in detail with reference to the following figures in which like elements are labeled with like numbers and in which.

DETAILED DESCRIPTION

An illustrative embodiment will be described in detail with reference to the accompanying drawings.

Figure 1:
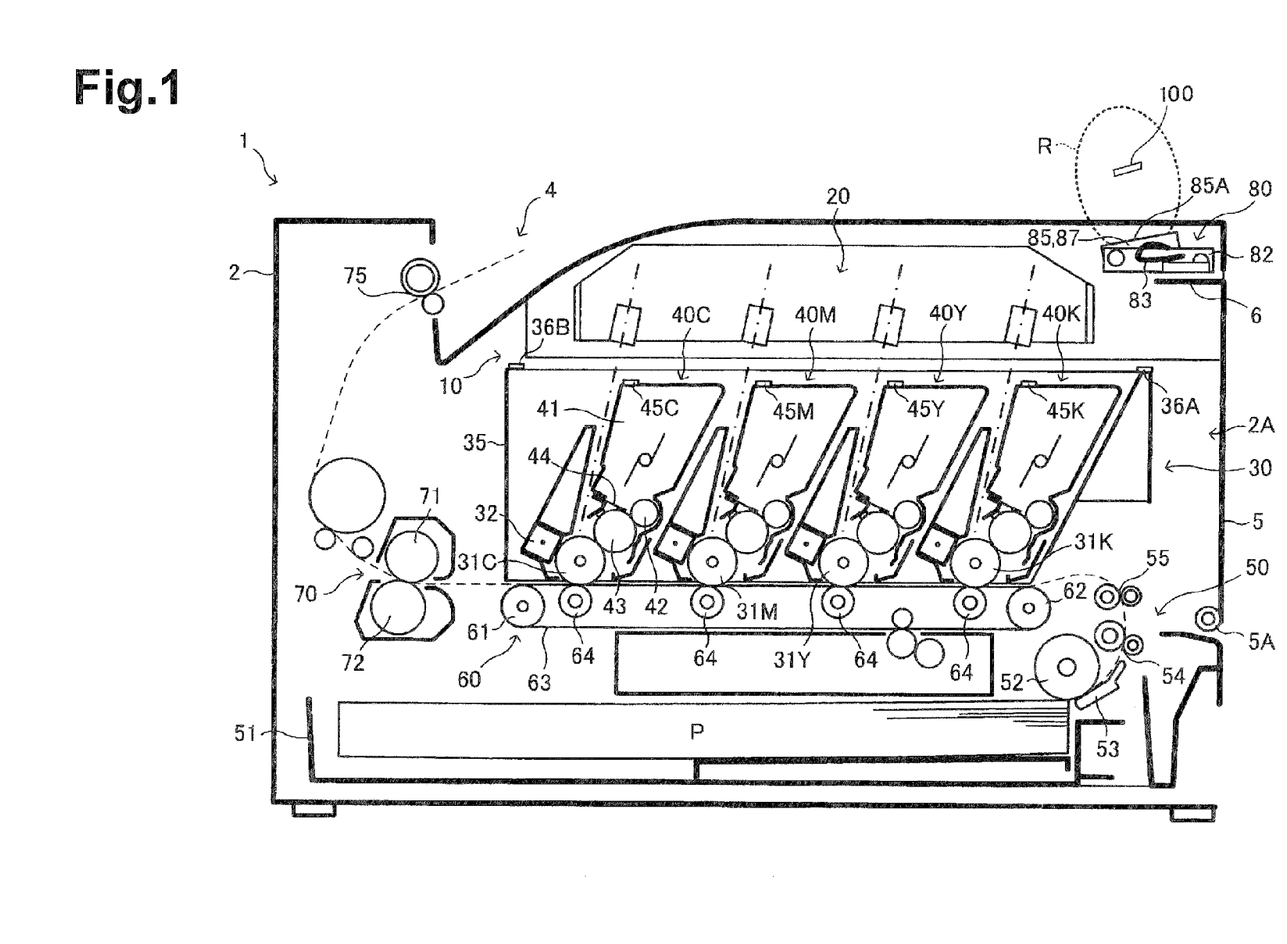
FIG. 1 is a side sectional view of an internal structure of a laser printer as an illustrative example of an image forming apparatus using features described herein.

An image forming apparatus according to aspects of the disclosure applies to a laser printer 1 as shown in FIG. 1. The laser printer 1 is an electrophotographic color laser printer that forms a color image on a recording sheet P. The recording sheet may include plain paper, cardboards, postcards, and transparency sheets.

For ease of discussion, in the following description, the "top" or "upper side", the "bottom" or "lower side", the "left" or "left side", the "right" or "right side", the "front" or "front side", and the "rear" or "rear side" are used to define the various parts when the laser printer 1 is disposed in an orientation in which it is intended to be used. In FIG. 1, the right side is referred to as the front or front side, the left side is referred to as the rear or the rear side, the upper side is referred to as the top or upper side, the down side is referred to as the bottom or lower side, and an up and down direction is referred to as a top-bottom direction or vertical direction.

Figure 7:
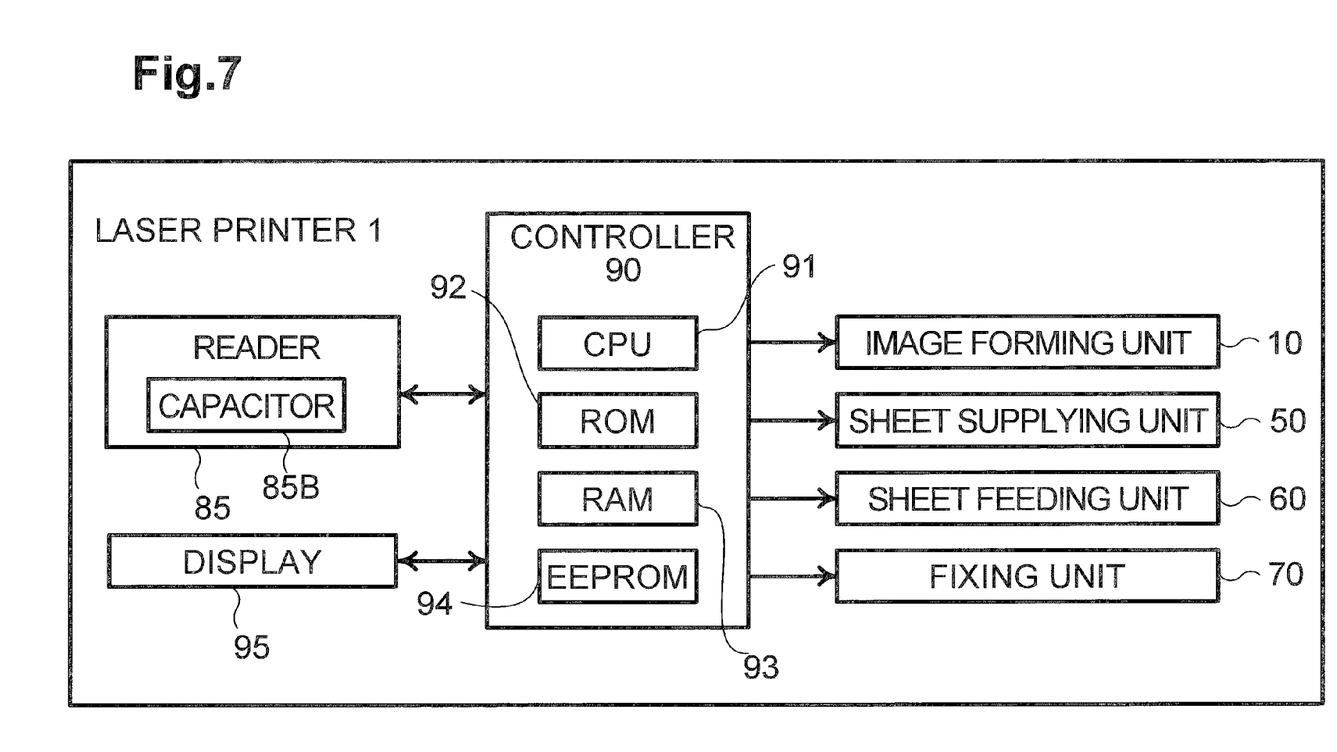
FIG. 7 is a block diagram illustrating a control system of a laser printer.

As shown in FIG. 1, the laser printer 1 may include a generally box-shaped main body 2. A front side of the main body 2 contains an opening 2A. The main body 2 accommodates an image forming unit 10, a sheet supplying unit 50, a sheet feeding unit 60, a fixing unit 70, a wireless tag reader unit 80, and a controller 90 (FIG. 7).

The main body 2 includes a frame member (not shown) inside. The image forming unit 10, the sheet supplying unit 50, the sheet feeding unit 60, and the fixing unit 70 are assembled to the frame member. The frame member includes a pair of side frames along right and left side surfaces of the main body 2. The side frames support a drawer case 35 such that the drawer case 35 slidably moves in the front-rear direction.

A top surface of the main body 2 contains an output tray 4 and a display 95. The output tray 4 is configured to store recording sheets 4 each having an image thereon such that they are overlaid, one over the other. The display 95 is configured to display various kinds of information, e.g. an error message relating to image formation, based on the controller 90.

Figure 3:
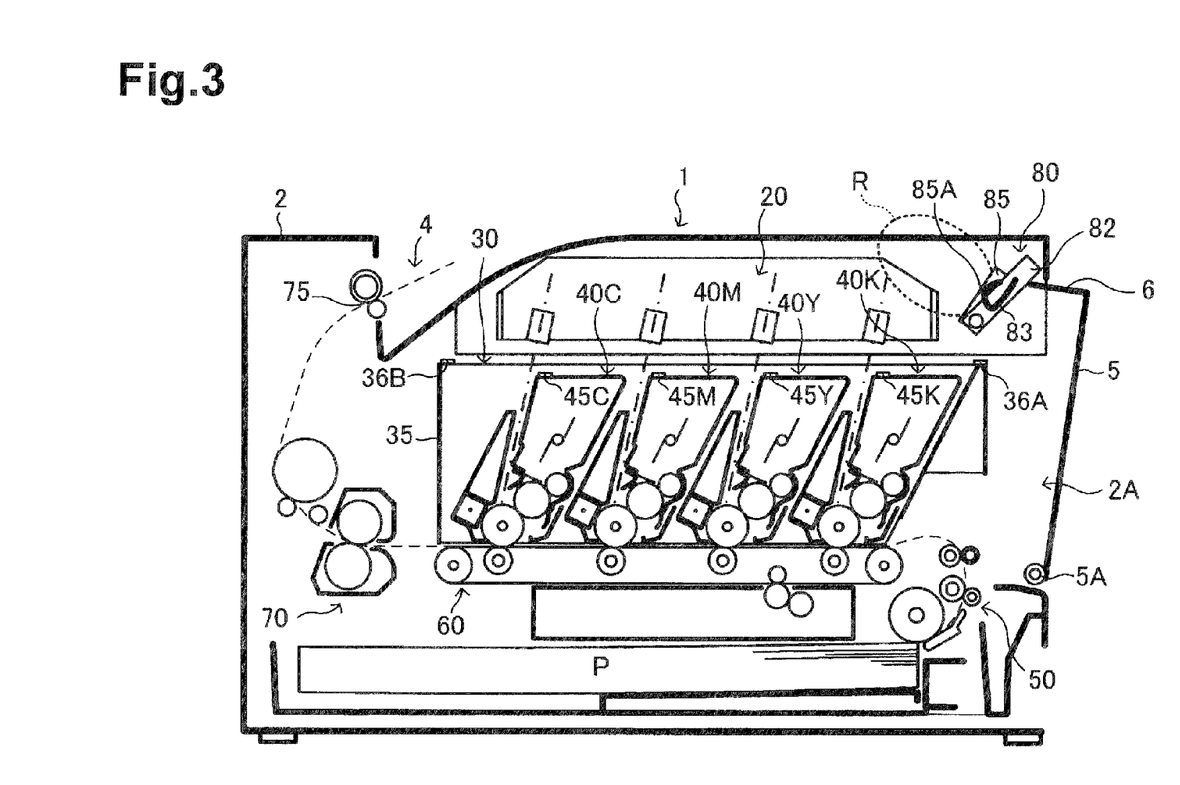
FIG. 3 is a side sectional view of the laser printer showing an operation of the wireless tag reader when a front cover is moved toward an open position.
Figure 4:
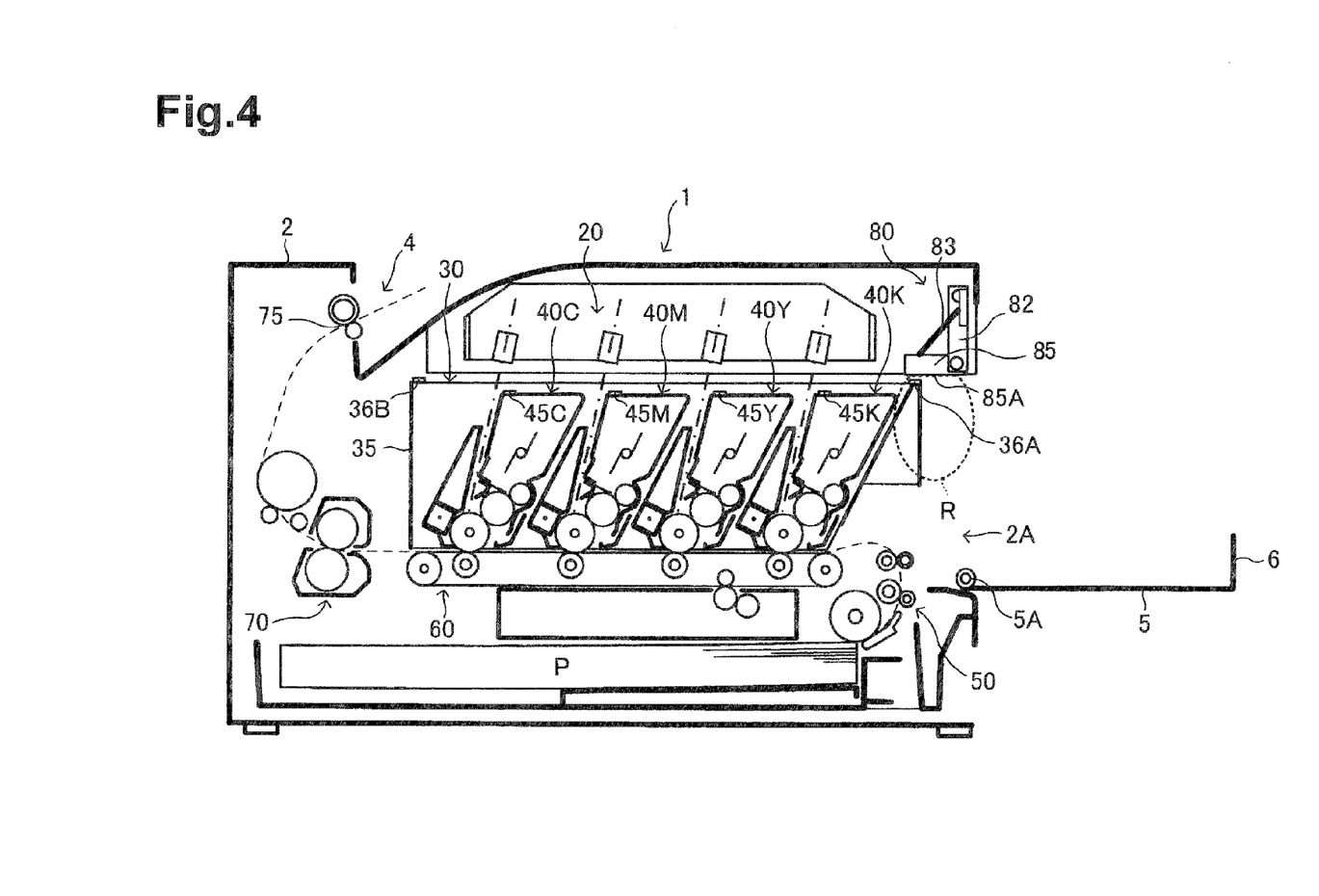
FIG. 4 is a side sectional view of the laser printer showing an operation of the wireless tag when the front cover is in the open position.
Figure 5:
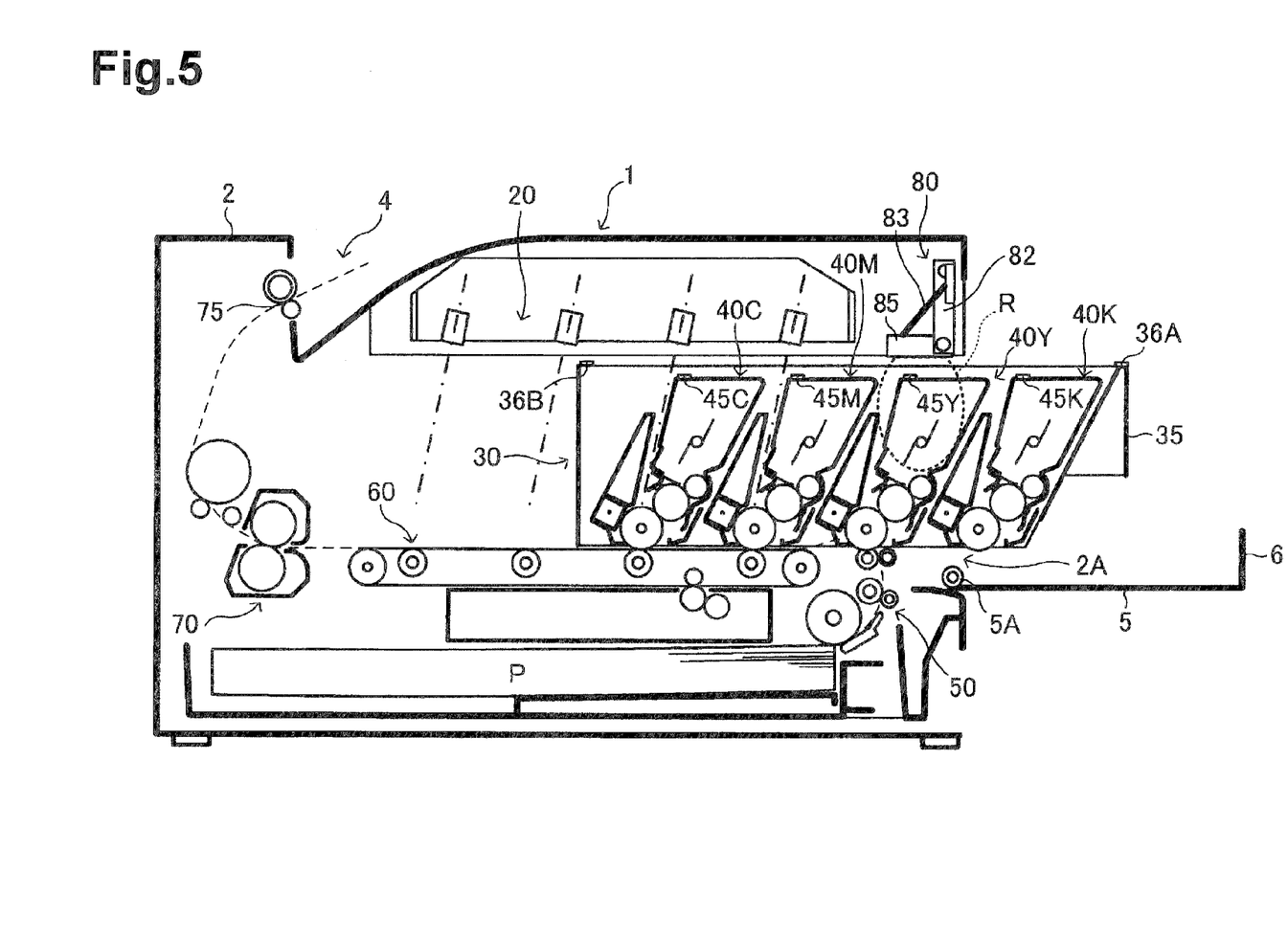
FIG. 5 is a side sectional view of the laser printer for process cartridge replacement.
Figure 6:
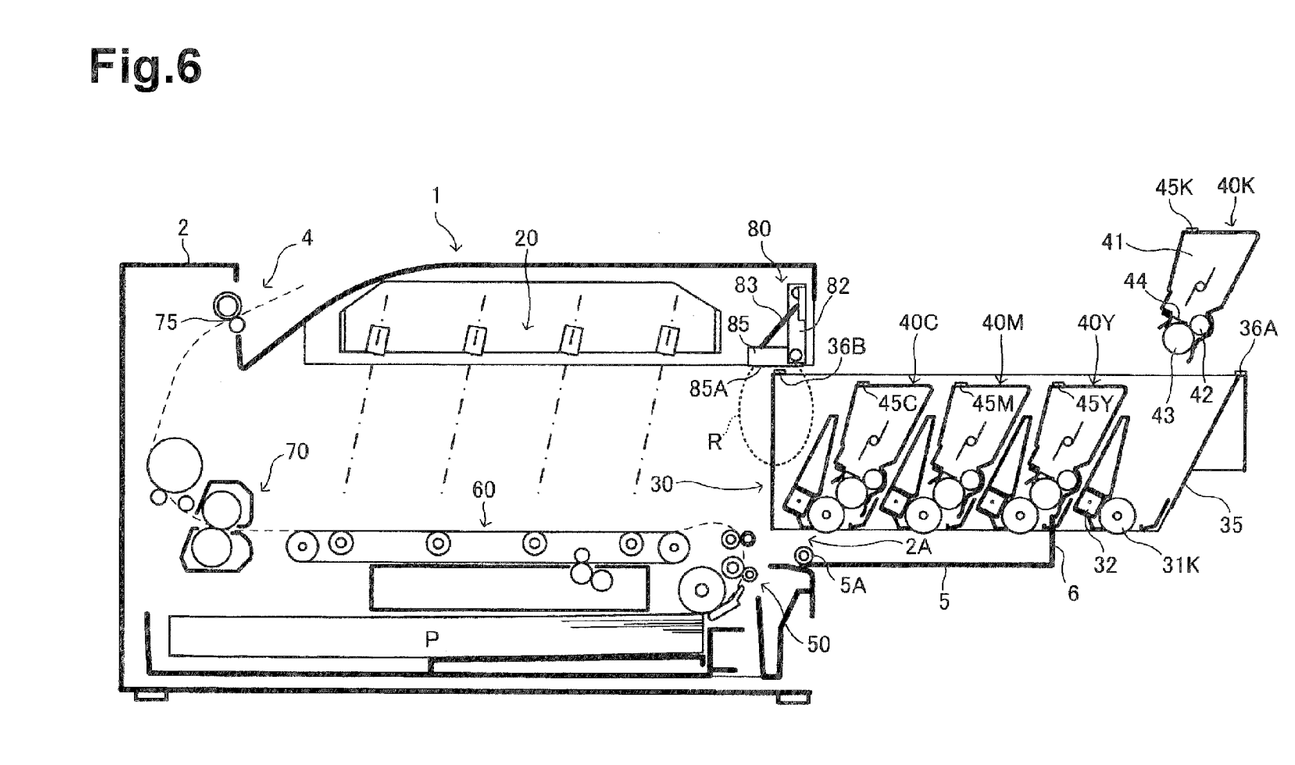
FIG. 6 is a side sectional view of the laser printer for process cartridge replacement.

The front side of the main body 3 contains a front cover 5 which opens and closes the opening 2 as shown in FIGS. 1 and 3-6. Specifically the front cover 5 is pivotally supported by the main body 2 via a shaft 5A which is disposed in a front lower portion of the frame member defining a lower end of the opening 2A. The front cover 5 is movable between a closed position in which the opening 2A is closed (FIG. 1) and an open position in which the opening 2A is open (FIGS. 4-6).

The front cover 5 includes a contact supporting portion 6, which is formed by bending an end opposite to the shaft 5A in a predetermined direction, e.g. rearward of the laser printer 1 in this embodiment. The contact supporting portion 6 is configured to contact the lower surface of the wireless tag reader unit 80, which is opposite to a reading surface 85A. When the front cover 5 is in the closed position, the contact supporting portion 6 is configured to support the wireless tag reader unit 80 from below such that the wireless tag reader unit 80 is placed in a first position (FIG. 1). When the wireless tag reader unit 80 is placed in the first position, the reading surface 85A of the wireless tag reader unit 80 faces toward the top surface of the main body 2 and the wireless tag reader unit 80 has a first reading range, e.g. a reading range R of the wireless tag reader unit 80 includes a predetermined position of the top surface of the main body 2 as shown in FIG. 1.

The main body 2 accommodates the wireless tag reader unit 80 slightly above a portion defining an upper end of the opening 2A. The wireless tag reader unit 80 includes the reading surface 85A and is disposed at the portion defining the upper end of the opening 2A such that the wireless tag reader unit 80 rotatably moves along a vertical direction. The wireless tag reader unit 80 has a reading range R extending from the reading surface 85A (FIG. 1). As shown in FIG. 1, when the front cover 5 is in the closed position, the wireless tag reader unit 80 is in the first position. At this time, the reading range R of the wireless tag reader unit 80 includes the predetermined position of the top surface of the main body 2. As shown in FIGS. 4-6, when the front cover 5 is in the open position, the wireless tag reader unit 80 is located in a second position. In the second position, the reading surface 85A faces downward inside of the main body 2, and the wireless tag reader unit 80 has a second reading range, e.g. the reading range R extends toward a central portion of the opening 2A as shown in FIGS. 4-6.

The wireless tag reader unit 80 is configured to read information from wireless tags, e.g. passive RFID tags, which are located within the reading range R, e.g. a first drawer tag 36A, a second drawer tag 36B, cartridge tags 45 and a wireless tag 100. The reading range R means a range in which the wireless tag reader unit 80 transmits and receives radio waves to and from the wireless tag. In this embodiment, when the wireless tag reader 80 is located in the first position, the wireless tag reader 80 is configured to read information from the wireless tag 100 as shown in FIG. 1. When the wireless tag reader 80 is located in the second position, the wireless tag reader 80 is configured to read information form the first drawer tag 36A, a second drawer tag 36B, and the cartridge tags 45 as shown in FIGS. 4-6.

The image forming unit 10 of the laser printer 1 will be described.

The image forming unit 10 is located in substantially a central portion inside the main body 2 and is configured to form an image on a recording sheet P. The image forming unit 10 includes a scanner unit 20 and a photosensitive member unit 30.

The scanner unit 20 is disposed in the top portion within the main body 2 and includes laser light sources, a polygon mirror, fθ lenses, and reflecting mirrors. The scanner unit 20 has, e.g. four, laser light sources, which are provided for a plurality of colors, e.g. four colors of black, yellow, magenta, and cyan. A laser beam emitted from each laser light source, based on image data, may be deflected by the polygon mirror, pass through the fθ lenses, and be folded by the reflecting mirror to be directed to a surface of each photosensitive drum 31, on which an electrical latent image is formed. The electrical latent image formed on each photosensitive drum 31 is to be developed with one of black, yellow, magenta, and cyan.

The photosensitive member unit 30 is disposed below the scanner unit 20 and above the sheet feeding unit 60. The photosensitive member unit 30 includes process cartridges 40, photosensitive drums 31, and chargers 32, which all are provided for a plurality of colors, e.g., four colors of black, yellow, magenta, and cyan. The photosensitive member unit 30 further includes the drawer case 35. The drawer case 35 holds four process cartridges 40 arranged in tandem in the front-rear direction. Process cartridges 40 are one type of consumable product (hereinafter "consumables"). Photosensitive drums 31 may also be considered a consumable.

As shown in FIGS. 4-6, the drawer case 35 is slidable along guides formed on the frame member in the front-rear direction of the laser printer 1. The drawer case 35 is movable between a use position shown in FIG. 6 and a replacement position shown in FIG. 8 in the front-rear direction. As shown in FIGS. 1 and 4, when the drawer case 35 is in the use position or located in the main body 2A, image is formed using the process cartridges 40. As shown in FIG. 6, when the drawer case 35 is in the replacement position or located outside the main body 2A, the process cartridges 40 can be attached to or removed from the drawer case 35 for replacement.

As shown in FIG. 1, each process cartridge 40 includes a toner chamber 41, a supply roller 42, a developing roller 43, a layer-thickness regulating blade 44, and a cartridge tag 45. Each process cartridge 40 is configured to be attached to and removed from the drawer case 35, independently. The toner chamber 41 forms an upper portion of the process cartridge 40, and is configured to store black, yellow, magenta, or cyan toner. The supply roller 42 is configured to supply toner in the toner chamber 41 to a surface of the developing roller 43. The developing roller 43 is configured to supply the toner supplied from the supply roller 42 to a surface of the photosensitive drum 31. The layer-thickness regulating blade 44 is configured to regulate the toner carried on the surface of the developing roller 43 to a uniform thickness.

The four process cartridges 40 are provided for colors of toner stored in the toner chamber 41: black, yellow, magenta, and cyan. In the illustrative embodiment, the process cartridges 40 are attached to the drawer case 35 such that a first process cartridge 40K storing black toner, a second process cartridge 40Y storing yellow toner, a third process cartridge 40M storing magenta toner, and a fourth process cartridge 40C storing cyan toner are arranged in this order from front to rear of the laser printer 1.

Each process cartridge 40 includes its corresponding cartridge tag 45 on the top surface thereof. In the following description, a cartridge tag 45 attached to the first process cartridge 40K is referred to as a first cartridge tag 45K, a cartridge tag 45 attached to the second process cartridge 40Y is referred to as a second cartridge tag 45Y, a cartridge tag 45 attached to the third process cartridge 40M is referred to as a third cartridge tag 45M, and a cartridge tag 45 attached to the fourth process cartridge 40C is referred to as a fourth cartridge tag 45C.

Each cartridge tag 45 is a wireless tag, e.g. a passive radio frequency identification (RFID) tag, which may be configured to receive radio waves from the wireless tag reader unit 80 as its operating power. Each cartridge tag 45 includes an antenna and an IC chip. The antenna may be a loop antenna or a spiral antenna and configured to allow the cartridge tag 45 to transmit and receive radio waves to and from the wireless tag reader unit 80. When the antenna receives radio waves including a command from the wireless tag reader unit 80, the antenna creates electromotive force by resonance.

The IC chip energizes the circuits by the electromotive force, and reads information stored in the cartridge tag 45. The IC chip transmits the read information to the wireless tag reader unit 80 via the antenna. The IC chip stores identification information specific to the cartridge tag 45 and information specific to the corresponding process cartridge 40. The information specific to the process cartridge 40 includes a date of manufacture of the process cartridge 40 and a manufacturer, and is written in the IC chip when the cartridge tag 45 is attached to the process cartridge 40.

The first, second, third and fourth cartridge tags 45K, 45Y, 45M, 45C are positioned on the top surfaces of the first, second, third and fourth process cartridges 40K, 40Y, 40M, 40C. Thus, the first, second, third and fourth cartridge tags 45K, 45Y, 45M, 45C pass under the wireless tag reader unit 80 placed in the second position or through the reading range R when the drawer case 35 moves between the use position and the replacement position.

The drawer case 35 includes four photosensitive drums 31 and four chargers 32. Each photosensitive drum 31 is rotatably supported below the corresponding process cartridge 40 and is disposed such as to contact a conveying belt 63 of the sheet feeding unit 60. Each charger 32 is a scorotron charger and is disposed in a position facing the corresponding photosensitive drum 31. The charger 32 is configured to positively charge the surface of the photosensitive drum 31 to form an electrostatic latent image on the photosensitive drum 31.

In the illustrative embodiment, as is the case with the process cartridges 40, the four photosensitive drums 31 includes a first photosensitive drum 31K corresponding to black toner, a second photosensitive drum 31Y corresponding to yellow toner, a third photosensitive drum 31M corresponding to magenta toner, and a fourth photosensitive drum 31C corresponding to cyan toner, which are arranged in this order from front to rear of the laser printer 1.

The drawer case 35 further includes a first drawer tag 36A and a second drawer tag 36B, which are wireless tags, e.g. passive RFID tags, and store identification information respectively. The first drawer tag 36A is disposed in a front upper end portion of the drawer case 35 and the second drawer tag 36B is disposed in a rear upper end portion of the drawer case 35. The first and second drawer tags 36A, 36B pass under the wireless tag reader unit 80 or through the reading range R as the drawer case 35 moves as shown in FIGS. 4-6.

The sheet supplying unit 50 of the laser printer 1 will be described.

The sheet supplying unit 50 includes a sheet supply tray 51, a sheet supply roller 52, a separation pad 53, a pair of feed rollers 54, and a pair of registration rollers 55.

The sheet supply tray 51 is configured to store a stack of recording sheets P and is disposed in a lower portion of the main body 2. The sheet supply cassette 51 may be configured to be attached to and removed from the front of the main body 2. The pick up roller 52 is rotatably disposed in a front upper portion of the sheet supply cassette 51 and configured to pick up sheets P in the sheet supply tray 51 and feed them toward the image forming unit 10. The separation pad 53 is configured to separate the sheets P picked up by the pickup roller 52 one by one. The feed rollers 54 are disposed downstream of the separation pad 53 in a sheet feeding direction, and configured to contact the sheet P separated by the separation pad 53 and feed it to the image forming unit 10. The registration rollers 55 are disposed at a downstream side from the feed rollers 54 in the sheet feeding direction and configured to contact the leading edge of the recording sheet P, correct skew of the recording sheet P and feed it further to the image forming unit 10.

The sheet feeding unit 60 of the laser printer 1 will be described.

The sheet feeding unit 60 is disposed below the image forming unit 10 and above the sheet supply tray 51. The sheet feeding unit 60 is configured to feed the recording sheet P supplied by the sheet supplying unit 50 toward the fixing unit 70. The sheet feeding unit 60 includes a drive roller 61, a driven roller 62, the conveying belt 63 and four transfer rollers 64.

The driven roller 61 and the driven roller 62 are spaced apart in the front-rear direction and parallel to each other under the image forming unit 10. The conveying belt 63 is an endless belt made of a conductive rubber and is stretched around the drive roller 61 and the driven roller 62. Thus, the conveying belt 63 rotates along with rotation of the drive roller 61. The upper surface of the conveying belt 63 contacts the photosensitive drums 31. The transfer rollers 64 are disposed within the conveying belt 63 and under the respective photosensitive drums 31 such that the conveying belt 63 is sandwiched between the transfer rollers 64 and the photosensitive drums 31.

The fixing unit 70 of the laser printer 1 will be described.

The fixing unit 70 is disposed behind the image forming unit 10. The fixing unit 70 includes a heat roller 71 and a pressure roller 72. The heat roller 71 is configured to feed the recording sheet P toward the output tray 4 disposed downstream in the sheet feeding direction, while heating toner transferred onto the recording sheet P. The pressure roller 72 is disposed facing the heat roller 71 and configured to rotate while pressing the recording sheet P toward the heat roller 71. Thus, the fixing unit 70 is configured to melt the toner transferred onto the recording sheet P by heat and fix it to the recording sheet P, while feeding the recording sheet P toward the output tray 4.

An ejection roller 75 is disposed upward from the fixing unit 70 such as to rotate along a rear end of the output tray 4. The ejection roller 75 is configured to eject the recording sheet P fed by the fixing unit 70 to the output tray 4.

In the printer 1, an image is formed on a recording sheet P as follows.

When the image formation starts, the sheet supplying unit 50 and the sheet feeding unit 60 operate to feed a recording sheet P from the sheet supply tray 51 to the image forming unit 10. During this time, the surfaces of the rotating photosensitive drums 31K, 31Y, 31M and 31C are uniformly and positively charged by the respective chargers 32, and exposed to laser beams emitted from the scanner unit 20, so that latent images based on image data are formed on the surfaces of the photosensitive drums 31K, 31Y, 31M and 31C.

In each of the process cartridges 40K, 40Y, 40M, and 40C, toner in the toner chamber 41 is supplied through the supply roller 42 and the developing roller 43 to the surface of the corresponding one of the photosensitive drums 31K, 31Y, 31M and 31C. As a result, the electrostatic latent image formed on the surface of each photosensitive drum 31 becomes visible and a reversal takes place. In this manner, toner images are carried on the surfaces of the photosensitive drums 31 K, 31Y, 31M and 31C.

The toner images carried on the surfaces of the photosensitive drums 31 are transferred onto a recording sheet P, which is fed along the surface of the conveying belt 63 from front to rear, by a voltage applied to the transfer rollers 64. When the recording sheet P having toner images is fed to the fixing unit 70, the fixing unit 70 melts toner by the application of heat, so that the toner images are fixed onto the recording sheet P as an image. The recording sheet P having the image is fed upward from the fixing unit 70 and ejected to the output tray 4.

The wireless tag reader unit 80 which is disposed in the laser printer 1 will be described.

Figure 2A:
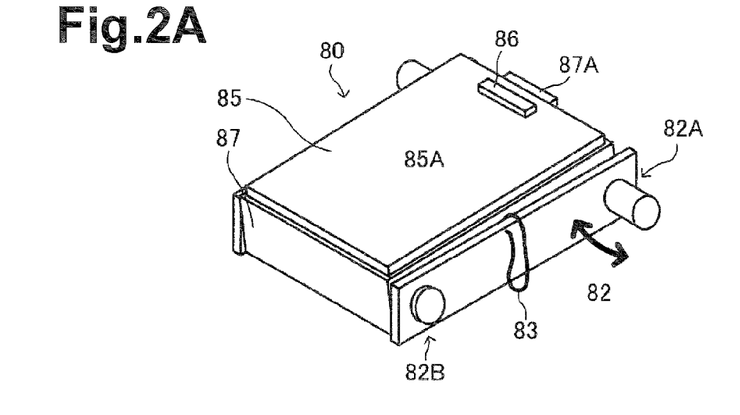
FIGS. 2A and 2B are perspective views of a wireless tag reader according to an illustrative embodiment.
Figure 2B:
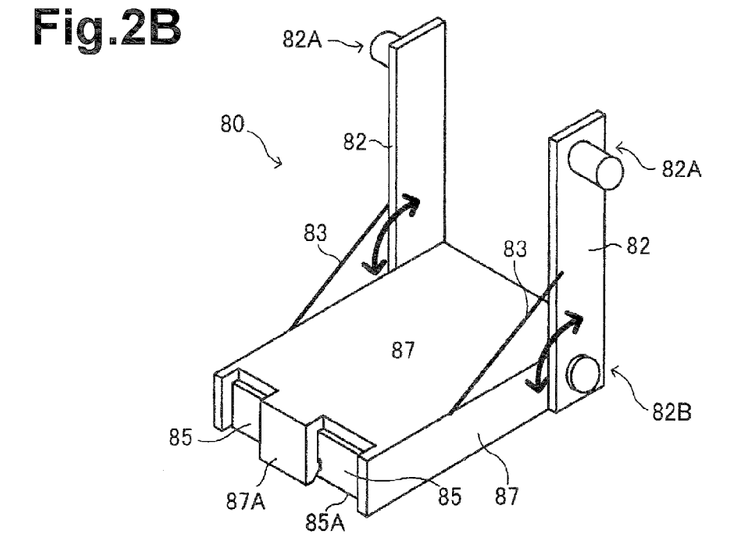
Figure 2C:
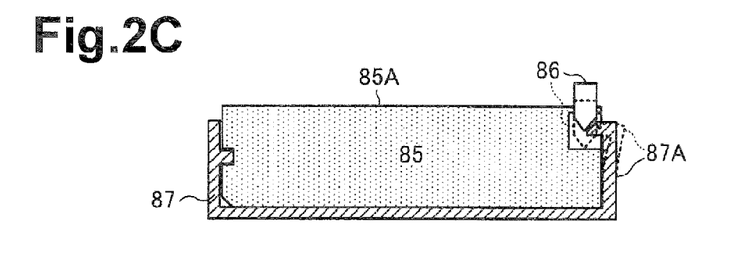
FIG. 2C is a side sectional view of the wireless tag reader.

As shown in FIG. 2, the wireless tag reader unit 80 includes a reader 85, a reader holder 87, a rotation supporting member, e.g. plates 82, and a regulating member, e.g. wires 83.

The reader 85 constitutes the main principal part of the wireless tag reader unit 80. The reader 85 is box-shaped, and has the reading surface 85A. The reading surface 85A includes the reading range R that extends in a predetermined direction, e.g., in a direction perpendicular to and away from a center of the reading surface 85A, as shown in FIGS. 1 and 3-6. The reader 85 emits radio waves including a command toward a wireless tag. The wireless tag responds by emitting radio waves, and the wireless tag reader unit 80 reads information stored in the wireless tag by receiving and decoding the radio waves received from the wireless tag. In other words, the reading surface 85A and the reading range R of the reader 85 constitute a reading surface and a reading range of the wireless tag reader unit 80.

The reader 85 includes a disengaging member 86. The disengaging member 86 is disposed in a hole formed in the reading surface 85A such that the disengaging member 86 is slidable perpendicularly to the reading surface 85A. As shown by a broken line in FIG. 2C, the disengaging member 86 is configured to slide in a predetermined direction, e.g. downward in FIG. 2C, to disengage from an engaging hook 87A.

The reader holder 87 is box-shaped to support, e.g. hold, the reader 85 inside in a detachable manner. The reader holder 87 is formed with the engaging hook 87A at one end in its longitudinal direction. The engaging hook 87A is configured to engage a hole formed on one side surface of the reader 85 such that the reader holder 87 holds the reader 85 therein. As shown in FIG. 2C, the engaging hook 87A is pressed outside of the hole by the disengaging member 86 when the disengaging member 86 slides downward. Thus, the engaging hook 87A is disengaged from the disengaging member 86, and the reader 85 is removed from the reader holder 87.

As shown in FIGS. 2A and 2B, the plates 82 are rectangle members which are rotatably supported, via support portions 82B, to both sidewalls of the reader holder 87 which extend in its longitudinal direction. The plates 82 are configured to rotatably support the reader holder 87 from outside via the support portions 82B, each of which is disposed at an end opposite to the engaging hook 87A. The plates 82 include respective attachment portions 82A, each of which is disposed at an end opposite to the support portion 82B. The attachment portions 82A hold the plates 82 slightly above the portion defining the upper end of the opening 2A so that the plates 82 rotate vertically. As shown in FIGS. 1, 3, and 4, the reader 85, the reader holder 87 and the plates 82 are configured to rotate vertically around the attachment portions 82A. The reader 85 and the reader holder 87 are configured to rotate around the support portions 82B.

The wires 83 having a predetermined length are attached to the reader holder 87 at one ends and to the plates 82 at the other ends. The wires 83 are configured to restrict an amount of rotation of the reader holder 87 with respect to the respective plates 82 to a predetermined amount corresponding to the predetermined length.

The operation of the wireless tag reader unit 80 in accordance with the movement of the front cover 5 will be described with reference to the drawings.

As shown in FIG. 1, when the front cover 5 is in the closed position, the wireless tag reader unit 80 is supported in contact with the top surface of the contact supporting portion 6 and is located in the first position. The reading surface 85A faces toward the top surface of the main body 2, and the reading range R becomes a range outside the main body 2. Thus, when the wireless tag reader unit 80 is in the first position, the wireless tag reader unit 80 can read information of a passive wireless tag 100 located outside the main body 2. The laser printer 1 uses the information of the wireless tag 100 located outside the main body 2 to perform various controls.

For example, the laser printer 1 may use the information of the wireless tag 100 located outside the main body 2, to perform a control for, e.g. secure printing. Secure printing is a process in which the laser printer 1 stands ready to perform printing onto a recording sheet P until a predetermined piece of identification information of the wireless tag 100, e.g. a user ID stored in a portable ID card that is brought to the laser printer 1 by the user, is input by the wireless tag reader unit 80.

Specifically, when print data in association with the identification information is input to the laser printer 1 along with a print instruction, the laser printer 1 holds a print output. When the user brings the wireless tag 100 storing the identification information, e.g. an ID card containing the wireless tag, within the reading range R of the wireless tag reader unit 80 located in the first position, a determination is made as to whether the information of the wireless tag 100 and the identification information of the print data match. When they match, the laser printer 1 performs the print output onto the recording sheet based on the print data. The laser printer 1 can maintain confidentiality of contents of the print output by the user.

When the front cover 5 moves around the shaft 5A from the closed position to the open position, the front cover 5 separates from the contact support portion 6, the contact support portion 6 moves toward the outside of the main body 2 along with the movement of the front cover 5. At this time, the contact support portion 6 is disengaging from the plates 82 as shown in FIG. 3, and the plates 82 become rotatable vertically around the respective attachment portions 82A. The center of gravity of the wireless tag reader unit 80 coincides with that of the reader 85, and is located on a side closer to the rotation supporting portions 82B than the attachment portions 82A. Thus, the wireless tag reader unit 80 vertically rotates around the attachment portions 82A under the weight of the wireless tag reader unit 80 along with the movement of the front cover 5.

When the front cover 5 is in the open position, the plates 82 are located such that the support portions 82B are located vertically below the attachment portions 82A. While the plates 82 rotate vertically downward, the reader 85 rotates around the rotation support portions 82B. When the amount of rotation of the reader 85 with respect to the plates 82 becomes a predetermined amount, the rotation of the reader 85 is stopped by the wires 83, as shown in FIGS. 2B and 4. In other words, the plates 82 are located such that they extend downward vertically from the respective attachment portions 82A, and the reader 85 rotates by the predetermined amount with respect to the plates 82, thereby the wireless tag reader unit 80 is located in the second position.

When the wireless tag reader unit 80 is in the second position, the reading surface 85A faces toward the bottom surface of the main body 2, and the reading range R extends downward vertically. In this case, the reading range R includes the position of the first drawer tag 36A attached to the drawer case 35 located in the use position, and the wireless tag reader unit 80 reads the information of the first drawer tag 36A.

The operation of the wireless tag reader unit 80 as the front cover 5 moves from the open position to the closed position will be described.

As the front cover 5 rotates around the shaft 5A toward the closed position by a predetermined amount, the contact support portion 6 is contacting the plates 82 of the wireless tag reader unit 80 which is located in the second position. As the front cover 5 further rotates toward the closed position, the plates 82 are rotating vertically upward around the respective attachment portions 82A.

When the front cover 5 reaches the closed position, the plates 82 contact the top surface of the contact support portion 6, and are located such that the plates 82 extend horizontally from the respective attachment portions 82A. At this time, the reader 85 rotates around the rotation support portions 82B in a direction where the wires 83 are loosened, and is located in a predetermined position. Thus, when the front cover 5 is in the closed position, the wireless tag reader unit 80 is located in the first position as shown in FIG. 1.

Replacement of a process cartridge 40 in the laser printer 1 will be described with reference to FIGS. 3-6.

When a process cartridge 40 is replaced because of, e.g. toner exhaustion, the front cover 5 is moved from the closed position to the open position. As the front cover 5 is moved to the open position, the wireless tag reader unit 80 is also moved in the second position, as shown in FIG. 4.

After the front cover 5 is moved to the open position, the drawer case 35 is moved from the use position inside the main body 2 (FIG. 4) to the front side of the laser printer 1. The drawer case 35 is slidingly moved through the opening 2A toward the replacement position (FIG. 6). At this time, the first drawer tag 36A moves outside of the reading range R of the wireless tag reader unit 80, which is located in the second position, along with the movement of the drawer case 35 to the replacement position (FIG. 5).

When the drawer case 35 is moved from the use position to the replacement position, the first, second, third, and fourth cartridge tags 45K, 45Y, 45M, 45C pass, in this order, the reading range R of the wireless tag reader unit 80, which is located in the second position, along with the movement of the drawer case 35 (FIG. 5). During the movement of the drawer case 35, the wireless tag reader unit 80 located in the second position reads information of the first, second, third, and fourth cartridge tags 45K, 45Y, 45M, 45C in this order.

When the drawer case 35 reaches the replacement position, the second drawer tag 36B enters the reading range R of the wireless tag reader unit 80, which is located in the second position, as shown in FIG. 6. At this time, the wireless tag reader unit 80 reads the information of the second drawer tag 36B, thereby the laser printer 1 detects the second drawer tag 36B. The laser printer 1 can detect the drawer case 35 in the replacement position by detecting the second drawer tag 36B.

As shown in FIG. 6, when the drawer case 35 is located in the replacement position, the process cartridges 40 can be individually removed from the drawer case 35. In the replacement position, a process cartridge 40 in which an error occurs due to, e.g., toner exhaustion, is replaced with a new process cartridge 40.

After the new process cartridge 40 is attached to the drawer case 35, the drawer case 35 is moved inside the main body 2 toward the use position. That is, the drawer case 35 is slidingly moved through the opening 2A toward the use position (FIG. 4). At this time, the second drawer tag 36B moves outside of the reading range R of the wireless tag reader unit 80 along with the movement of the drawer case 35 to the use position (FIG. 5).

When the drawer case 35 is moved from the replacement position to the use position, the fourth, third, second, and first cartridge tags 45C, 45M, 45Y, 45K pass, in this order, the reading range R of the wireless tag reader unit 80, which is located in the second position, along with the movement of the drawer case 35. During the movement of the drawer case 35, the wireless tag reader unit 80 reads information of the fourth, third, second, and first cartridge tags 45C, 45M, 45Y, 45K in this order.

When the drawer case 35 reaches the use position, the first drawer tag 36A is located within the reading range R of the wireless tag reader unit 80, which is located in the second position (FIG. 4). At this time, the wireless tag reader 80 reads the information of the first drawer tag 36A, thereby the laser printer 1 detects the first drawer tag 36A. Thus, the laser printer 1 can detect the drawer case 35 in the use position by detecting the first drawer tag 36A.

After the drawer case 35 is located in the use position, the front cover 5 is moved from the open position to the closed position (FIGS. 1 and 3). When the front cover 5 is moved in the closed position, replacement of the process cartridge 40 is finished. The wireless tag reader unit 80 is moved from the second position to the first position along with the movement of the front cover 5 to the closed position. At this time, when the drawer case 35 is in the use position and image formation onto a recording sheet P is available, the laser printer 1 can be ready to read the wireless tag 100 located outside of the laser printer 1. Thus, the laser printer 1 uses the wireless tag reader unit 80 for controlling the laser printer 1, e.g. secure printing, in a state where image formation is available.

A control system of the laser printer 1 will be described.

Figure 8:
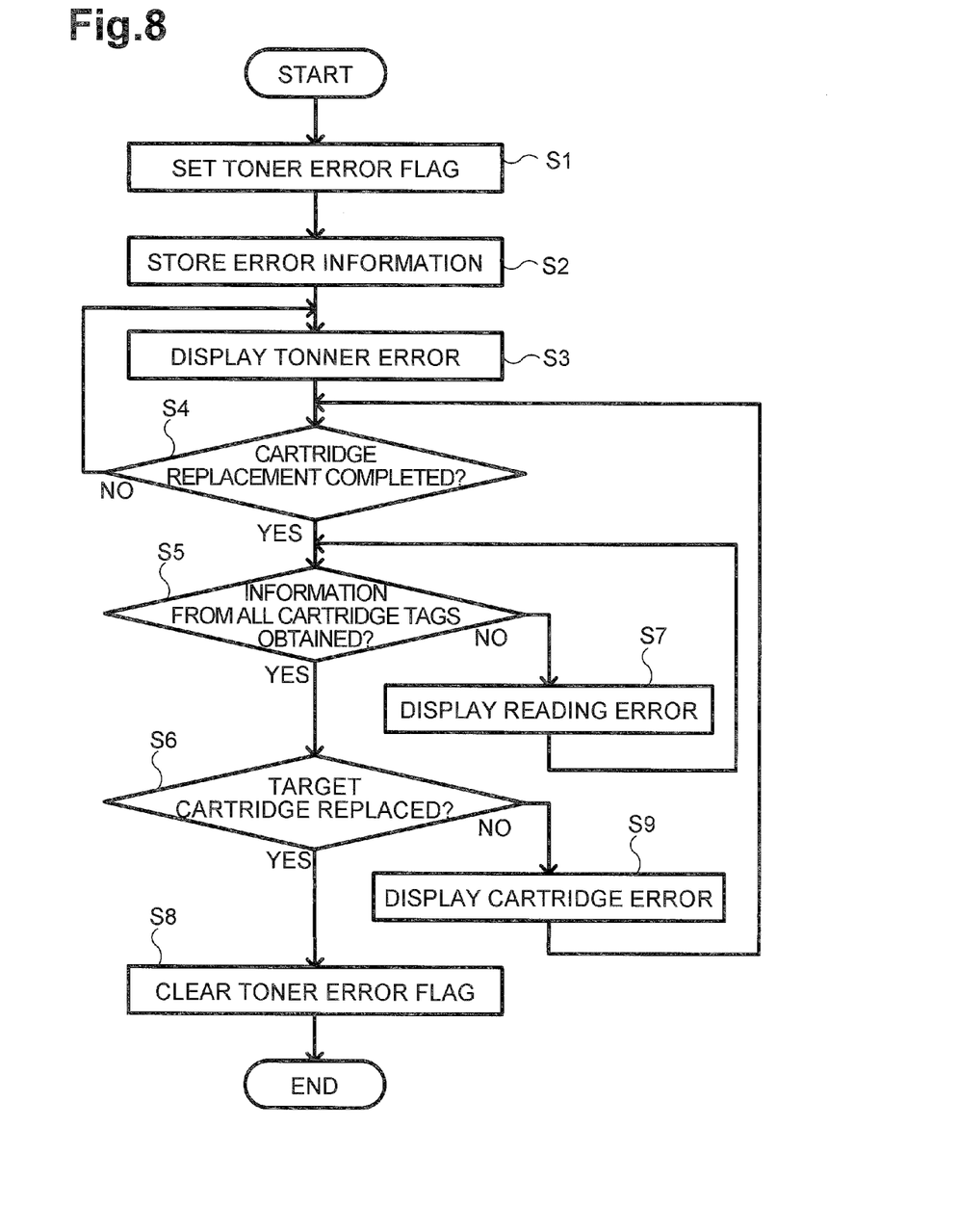
FIG. 8 is a flowchart of a toner error handling program.

As shown in FIG. 7, the laser printer 1 includes a controller 90. The controller 90 is made up of a central process unit (CPU) 91, a read-only memory (ROM) 92, a random access memory (RAM) 93, and an electrically erasable programmable read only memory (EEPROM) 94. The CPU 91 is the core part that controls all the data relating to the laser printer 1, and performs control programs, e.g., a toner error handling program (FIG. 8). The ROM 92 stores the control programs and data tables required for controlling the laser printer 1. The r toner error handling program is stored in the ROM 92. The RAM 93 is a volatile memory that temporarily stores computation results by the CPU 91.

The EEPROM 94 is a non-volatile memory that stores various kinds of data, e.g. user configuration settings, relating to image formation of the laser printer 1. Specifically, the EEPROM 94 stores identification information read from the cartridge tags 45, and the number of pages which have been output since each process cartridge 40 was attached. In addition, the EEPROM 94 may store error information for each piece of identification information based on the toner error handling program.

The controller 90 is connected to the reader 85. Thus, the controller 90 may process information read by the reader 85, i.e., the wireless tag reader unit 80, based on the control programs. For example, the controller 90 may allow the EEPROM 94 to store information of the cartridge tags 45 read by the reader 85 by identification information. As described above, the reader 85 is detachable from the reader holder 87, and further includes a capacitor 85B inside. The capacitor 85B functions as a battery of the reader 85 when detached from the reader holder 87.

The controller 90 is also connected to the display 95. Thus, the controller 90 may allow the display 95 to display various messages in accordance with the control programs. For example, the controller 90 may display various error messages on the display 95 in accordance with the toner error handling program (e.g. S3, S7, and S9 in FIG. 8).

The controller 90 is further connected to the image forming unit 10, the sheet supplying unit 50, the sheet feeding unit 60, and the fixing unit 70. Thus, the controller 90 controls the image forming unit 10 to form an image on a recording sheet P based on print data.

The toner error handling program will be described with reference to FIG. 8.

This program is executed by the CPU 91 when a condition for a toner error (hereinafter referred to as toner error condition) is satisfied. A confirmation as to whether the toner error condition is satisfied is carried out at a predetermined time, e.g., at power-on, at the time when a predetermined number of sheets has been printed, and after the elapse of a predetermined time.

The toner error condition includes that the amount of toner remaining in a process cartridge 40 is smaller than a predetermined amount (hereinafter referred to as a toner empty condition) and that toner in a process cartridge 40 suffers deterioration (hereinafter referred to as a toner deterioration condition). The toner error condition is satisfied by either the toner empty condition or the toner deterioration condition, and the CPU 91 determines that a toner error occurs in the laser printer 1.

The toner empty condition is determined based on the number of recoding sheets P printed from a process cartridge 40 since the process cartridge 40 has been attached to the drawer case 35. When the number of recording sheets P printed from a process cartridge 40 exceeds a predetermined number, the CPU 91 determines that the process cartridge 40 satisfies the toner empty condition.

The toner deterioration condition is determined based on the elapsed time since the manufacture date of the process cartridge 40, the number of rotations of the photosensitive drum 31, and the number of recording sheets P printed from the process cartridge 40 since start of use. For example, the CPU 91 specifies the manufacture date of the process cartridge 40 from information obtained from its cartridge tag 45, and determines that the toner deterioration condition is satisfied when a period of time since the manufacture date until now is longer than a predetermined period of time.

When the toner error condition is satisfied, the CPU 91 sets a toner error flag in the RAM 93 in S1. The toner error flag means that a process cartridge 40 satisfies the toner error condition and that the toner error occurs in the laser printer 1. After setting the toner error flag, the CPU 91 proceeds to S2.

In S2, the CPU 91 executes an error information storage process. In the error information storage process (S2), the CPU 91 specifies a process cartridge 40 that satisfies the toner error condition (hereinafter referred to as a target process cartridge), and stores error information in the EEPROM 94 by associating the error information with identification information which has been obtained from a cartridge tag 45 of the target process cartridge 40. The error information indicates that the process cartridge 40 satisfies the toner error condition and that the error occurs in the process cartridge 40. When the error information storage process is finished, the CPU 91 proceeds to S3.

When the drawer case 35 holding the process cartridges 40 is moved from the replacement position to the use position, identification information of the cartridge tags 45 attached to the respective process cartridges 40 is read by the wireless tag reader unit 80 and stored in the EEPROM 94 in association with the process cartridges 40.

In S3, the CPU 91 executes a toner error notification process. In the toner error notification process (S3), the CPU 91 causes the display 95 to display messages indicating for example that a toner error occurs and that the target cartridge needs replacement. When the toner error notification process is finished, the CPU 91 proceeds to S4.

In S4, the CPU 91 determines whether cartridge replacement is completed. Specifically, the CPU 91 causes the wireless tag reader unit 80 to always detect the first drawer tag 36A and the second drawer tag 36B. Thereby, the CPU 91 detects the movement of the drawer case 35 to the replacement position and the movement of the drawer case 35 to the use position, in this order and determines whether the cartridge replacement is completed. When the cartridge replacement is completed (S4: Yes), the CPU 91 proceeds to S5. When the cartridge replacement is not completed (S4: No), the CPU 91 returns to S3, and causes the display 95 to display a toner error.

In S5, the CPU 91 determines whether information of all cartridge tags 45 is obtained by the movement of the drawer case 35 during cartridge replacement. As described above, information of each cartridge tag 45 is read by the wireless tag reader unit 80 when each cartridge tag 45 passes through the reading range R along with the movement of the drawer case 35, and the information is stored in the EEPROM 94. In S5, the CPU 91 determines whether the EEPROM 94 stores information of all cartridge tags 45. When the EEPROM 94 stores information of all cartridge tags 45 (S5: Yes), the CPU 91 proceeds to S6. When the EEPROM 94 does not store the information of all cartridge tags 45 (S5: No), the CPU 91 proceeds to S7.

In S6, the CPU 91 determines whether the target cartridge has been replaced with a new one. Specifically, the CPU 91 compares the information of the cartridge tag 45 of the target cartridge 40, which has been already stored in the EEPROM 94, with information of a cartridge tag 45 of a new cartridge 40, which is newly obtained during cartridge replacement. When the target cartridge has been replaced with a new one (S6: Yes), the CPU 91 proceeds to S8. When the target cartridge is not replaced (S6: No), the CPU 91 proceeds to S9.

In S7, the CPU 91 executes a reading error notification process. In the reading error notification process (S7), the CPU 91 causes the display 95 to display messages indicating for example that information of all cartridge tags 45 could not be read and that the drawer case 35 should be moved again between the use position and the replacement position. When the reading error notification process is finished, the CPU 91 returns to S5. The CPU 91 repeats S5 and S7 until information of all cartridge tags 45 is obtained.

In S8, the CPU 91 clears the toner error flag. By cleaning the toner error flag, the laser printer 1 is ready for image formation in normal operation. After clearing the flag, the CPU 91 finishes the toner error handling program.

In S9, the CPU 91 executes a cartridge error notification process. In the cartridge error notification process (S9), the CPU 91 causes the display 95 to display messages indicating for example that the target cartridge, which becomes a cause of a toner error, is not replaced with a new one. When the cartridge error notification process is finished, the CPU 91 returns to S4.

As described above, the laser printer 1 according to the illustrative embodiment includes the main body 2, the front cover 5 to open and close the opening 2A, the process cartridges 40, the drawer case 35, and the wireless tag reader unit 80. As shown in FIGS. 1 and 3-6, the front cover 5 is attached to the main body 2 such that it is configured to rotate around the shaft 5A between the closed position and the open position. As shown in FIGS. 4-6, the drawer case 35 accommodates and guides the first, second, third, and fourth process cartridges 40K, 40Y, 40M, 40C to the use position. The first, second, third and fourth process cartridges 40K, 40Y, 40M, 40C have their respective cartridge tags 45.

The wireless tag reader unit 80 is disposed inside the main body 2 such that it is rotatable vertically above the opening 2A. When the front cover 5 is in the closed position, the wireless tag reader unit 80 contacts the contact support portion 6 and is located in the first position. In this case, the reading surface 85A faces toward the top surface of the main body 2, and the reading range R includes a predetermined position outside the main body 2 as shown in FIG. 1. Thus, when the front cover 5 is in the closed position, the laser printer 1 can read information of the wireless tag 100 located outside of the laser printer 1 and perform a control, e.g., secure printing, using the information of the wireless tag.

The wireless tag reader unit 80 includes the reader 85, the reader holder 87, the plates 82, and the wires 83. When the front cover 5 moves from the closed position to the open position, the plates 82 rotate around the respective attachment portions 82A downward vertically. At this time, the reader holder 87 and the reader 85 rotate around the rotating support portions 82B by a predetermined amount corresponding to the length of the wires 83. As a result, the wireless tag reader unit 80 moves to the second position along with the movement of the front cover 5 to the open position. Thus, the laser printer 1 can move the wireless tag reader unit 80 to the second position along with the movement of the front cover 5.

When the wireless tag reader unit 80 is in the second position, the reading surface 85A faces toward the bottom surface of the main body 2 and the reading range R becomes the area having the downward direction. When the drawer case 35 is moved between the use position and the replacement position with this state, the first drawer tag 36A, the cartridge tags 45, and the second drawer tag 36B pass through the reading range R of the wireless tag reader unit 80 which is located in the second position as shown in FIG. 5. Thus, when the wireless tag reader unit 80 is in the second position, the wireless tag reader unit 80 can read information of the first drawer tag 36A, the cartridge tags 45, and the second drawer tag 36B, and the laser printer 1 can perform the toner error handling program as shown in FIG. 8. Thus, the laser printer 1 allows the user to replace and maintain process cartridges 40.

When the front cover 5 moves from the open position to the closed position, the plates 82 contact the contact support portion 6 and rotate upward around the respective attachment portions 82A. At this time, the reader 85 rotates around the rotation support portions 82B in the direction where the wires 83 are loosened. As a result, when the front cover 5 is in the closed position, the wireless tag reader unit 80 is supported from below by the contact support portion 6 and is located in the first position as shown in FIG. 1. In other words, the laser printer 1 can move the wireless tag reader unit 80 to the first position along with the movement of the front cover 5 to the closed position. As a result, the laser printer 1 can make effective use of the wireless tag reader unit 80 by changing the position of the wireless tag reader unit 80 along with the movement of the front cover 5.

The wireless tag reader unit 80 is mainly made up of the reader 85 and the reader holder 87. The reader 85 is accommodated in the reader holder 87 and held in position by the engaging hook 87A. When the disengaging member 86 is slid downward, the reader 85 disengages from the engaging hook 87A and is removed from the reader holder 87. The reader 85 removed from the reader holder 87 may be efficiently used. For example, the reader 85 may be used alone or in other apparatus. If an error occurs in the reader 85, the reader 85 can be replaced with a new one simply in the laser printer 1.

The above illustrative embodiment shows, but is not limited to, that the drawer tags 36A, 36B, and the cartridge tags 45 are wireless tags, e.g. passive RFID tags. Active and semi-passive RFID tags may be used instead of the passive RFID tags.

The above illustrative embodiment shows, but is not limited to, the wireless tag reader unit 80. The wireless tag reader unit 80 may be structured in any way as long as it moves between the first position where the reading range R includes a predetermined position outside of the main body 2 and the second position where information of a wireless tag, which is located inside the main body 2, can be read.

For example, the reader 85 may be rotatably supported vertically, and the reading surface 85A may be rotated 180 degrees from a state where the surface 85A faces upward, such that the wireless tag reader unit 80 may move between the first position and the second position. In this case, the reader 85 may be rotated under control of a drive motor by a sensor which detects the position of the front cover 5. Thus, the rotation of the reader 85 may be linked with the movement of the front cover 5.

In addition, the front cover 5 may not be essential. The wireless tag reader unit 80 may be configured to move between the first position and the second position singly without the front cover 5. In this case, the wireless tag reader unit 80 may move electronically or manually.

In the toner error handling program, a determination is made as to whether the target cartridge, which is a cause of a toner error, has been replaced with a new one and then the cartridge error notification process (S9) is executed. However, the disclosure is not limited to this embodiment. For example, the toner error handling program may proceed as follows: each cartridge tag 45 may store information regarding a toner color of the corresponding process cartridge 40 to which the cartridge tag 45 is attached, and a determination may be made as to whether each process cartridge 40 is disposed in a predetermined position in the drawer case 35. The laser printer 1 may be configured to obtain information of each cartridge tag 45 from the movement of the drawer case 35 and to find the position of each process cartridge 40 in the drawer case 35 based on the information regarding the toner color. In this case, it is preferable that, if the process cartridge 40 is incorrectly disposed in the drawer case 35, such a message is displayed on the display 95.

The above illustrative embodiment shows, but is not limited to, the direct-tandem type color laser printer. It will be appreciated that this illustrative embodiment also applies to other types of image forming apparatuses, an intermediate transfer type color laser printer, four-cycle color laser printer, and monochrome printer as well. In addition, development may be performed with not only single component development method but also two-component development method.

The above illustrative embodiment shows, but is not limited to, that the wireless tag reader unit 80 reads information of the cartridge tags 45 when the wireless tag reader unit 80 is located in the second position and the drawer case 35 moves between the use position and the replacement position. When the drawer case 35 is in the use position, the reading range R may include the positions of the cartridge tags 45. In this case, the wireless tag reader unit 80 may read the information of the cartridge tags 45 during printing, for example.

While the features herein have been described in connection with various example structures and illustrative aspects, it will be understood by those skilled in the art that other variations and modifications of the structures and aspects described above may be made without departing from the scope of the disclosures described herein. Other structures and aspects will be apparent to those skilled in the art from a consideration of the specification or practice of the features disclosed herein. It is intended that the specification and the described examples only are illustrative with the true scope of the disclosures being defined by the following claims.

What is claimed is:

1. An image forming apparatus comprising:
   a main body including:
      an image forming unit configured to form an image on a recording medium; and
      a reader including a reading surface; and
   a moving mechanism configured to move the reader between a first position where the reading surface of the reader faces outside the main body and a second position where the reading surface of the reader faces inside the main body, wherein, when the reader is in the first position, the reader is configured to wirelessly communicate with a first wireless device, and wherein, when the reader is in the second position, the reader is configured to wirelessly communicate with a second wireless device.

2. The image forming apparatus according to claim 1, wherein the first wireless device includes a wireless tag storing the information.

3. The image forming apparatus according to claim 1, wherein the first wireless device includes a passive radio frequency identification tag.

4. The image forming apparatus according to claim 1, further comprising an accommodating unit configured to accommodate a cartridge containing toner, and wherein the second wireless device is attached to the cartridge.

5. The image forming apparatus according to claim 1, wherein the main body has an opening, wherein the moving mechanism includes a cover configured to move between a closed position where the opening is covered and an open position where the opening is exposed, wherein, when the cover is in the closed position, the reader is in the first position, and wherein, when the cover is in the open position, the reader is in the second position.

6. The image forming apparatus according to claim 1, wherein the moving mechanism is configured to rotate the reader between the first position and the second position.

7. The image forming apparatus according to claim 1, wherein the reader is configured to, when in the first position, read information from the first wireless device.

8. The image forming apparatus according to claim 1, wherein the reader is configured to, when in the second position, read information from the second wireless device.

* * * * *